US012095153B2

(12) United States Patent
Chen et al.

(10) Patent No.: US 12,095,153 B2
(45) Date of Patent: Sep. 17, 2024

(54) ANTENNA STRUCTURE

(71) Applicant: Quanta Computer Inc., Taoyuan (TW)

(72) Inventors: Chun-I Chen, Taoyuan (TW); Chun-Yuan Wang, Taoyuan (TW); Chung-Ting Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 208 days.

(21) Appl. No.: 17/935,144

(22) Filed: Sep. 26, 2022

(65) Prior Publication Data

US 2024/0047864 A1 Feb. 8, 2024

(30) Foreign Application Priority Data

Aug. 5, 2022 (TW) ................................. 111129635

(51) Int. Cl.
*H01Q 1/38* (2006.01)
*H01Q 5/307* (2015.01)

(52) U.S. Cl.
CPC ............... *H01Q 1/38* (2013.01); *H01Q 5/307* (2015.01)

(58) Field of Classification Search
CPC .......... H01Q 1/38; H01Q 5/307; H01Q 5/371; H01Q 5/378; H01Q 9/42
See application file for complete search history.

(56) References Cited

U.S. PATENT DOCUMENTS

| | | | | |
|---|---|---|---|---|
| 8,749,448 | B2 | 6/2014 | Tsou et al. | |
| 2019/0198975 | A1* | 6/2019 | Chen | H01Q 9/42 |
| 2021/0044000 | A1* | 2/2021 | Chang | H01Q 1/38 |

FOREIGN PATENT DOCUMENTS

TW 201244252 A 11/2012

OTHER PUBLICATIONS

Chinese language office action dated Jul. 13, 2023, issued in application No. TW 111129635.

* cited by examiner

*Primary Examiner* — David E Lotter
(74) *Attorney, Agent, or Firm* — McClure, Qualey & Rodack, LLP

(57) ABSTRACT

An antenna structure includes a first radiation element, a second radiation element, a third radiation element, a fourth radiation element, a fifth radiation element, and a nonconductive support element. The first radiation element has a feeding point. The second radiation element is coupled to the first radiation element. The third radiation element is coupled to a ground voltage and adjacent to the first radiation element. The fourth radiation element is coupled to the first radiation element. The fifth radiation element is coupled to the ground voltage and adjacent to the second radiation element. The first radiation element, the second radiation element, the third radiation element, and the fourth radiation element are at least partially surrounded by the fifth radiation element. The first radiation element, the second radiation element, the third radiation element, the fourth radiation element, and the fifth radiation element are disposed on the nonconductive support element.

10 Claims, 3 Drawing Sheets

300

ANTENNA STRUCTURE

CROSS REFERENCE TO RELATED APPLICATIONS

This application claims priority of Taiwan Patent Application No. 111129635 filed on Aug. 5, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area, these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may affect the communication quality of the mobile device in which it is installed. Accordingly, it has become a critical challenge for antenna designers to design a wideband antenna structure that is small in size.

BRIEF SUMMARY OF THE INVENTION

In an exemplary embodiment, the invention is directed to an antenna structure that includes a first radiation element, a second radiation element, a third radiation element, a fourth radiation element, a fifth radiation element, and a nonconductive support element. The first radiation element has a feeding point. The second radiation element is coupled to the first radiation element. The third radiation element is coupled to a ground voltage, and is adjacent to the first radiation element. The fourth radiation element is coupled to the first radiation element. The fifth radiation element is coupled to the ground voltage, and is adjacent to the second radiation element. The first radiation element, the second radiation element, the third radiation element, and the fourth radiation element are at least partially surrounded by the fifth radiation element. The first radiation element, the second radiation element, the third radiation element, the fourth radiation element, and the fifth radiation element are disposed on the nonconductive support element.

In some embodiments, the combination of the first radiation element and the second radiation element substantially has a W-shape.

In some embodiments, the second radiation element includes a first widening portion, the third radiation element includes a second widening portion, and the fourth radiation element includes a third widening portion.

In some embodiments, the fifth radiation element substantially has a meandering shape for defining a notch region, and the second radiation element extends into the interior of the notch region.

In some embodiments, the fifth radiation element includes a fourth widening portion and a terminal widening portion, and the terminal widening portion has an opening.

In some embodiments, a first coupling gap is formed between the third radiation element and the first radiation element, and a second coupling gap is formed between the fifth radiation element and the second radiation element. The width of each of the first coupling gap and the second coupling gap is from 0.25 mm to 3 mm.

In some embodiments, the antenna structure covers a first frequency band, a second frequency band, and a third frequency band. The first frequency band is from 690 MHz to 960 MHz. The second frequency band is from 1500 MHz to 2200 MHz. The third frequency band is from 2300 MHz to 2700 MHz.

In some embodiments, the total length of the first radiation element and the second radiation element is substantially equal to 0.25 wavelength of the second frequency band.

In some embodiments, the length of the third radiation element is substantially equal to 0.25 wavelength of the third frequency band.

In some embodiments, the length of the fifth radiation element is substantially equal to 0.25 wavelength of the first frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
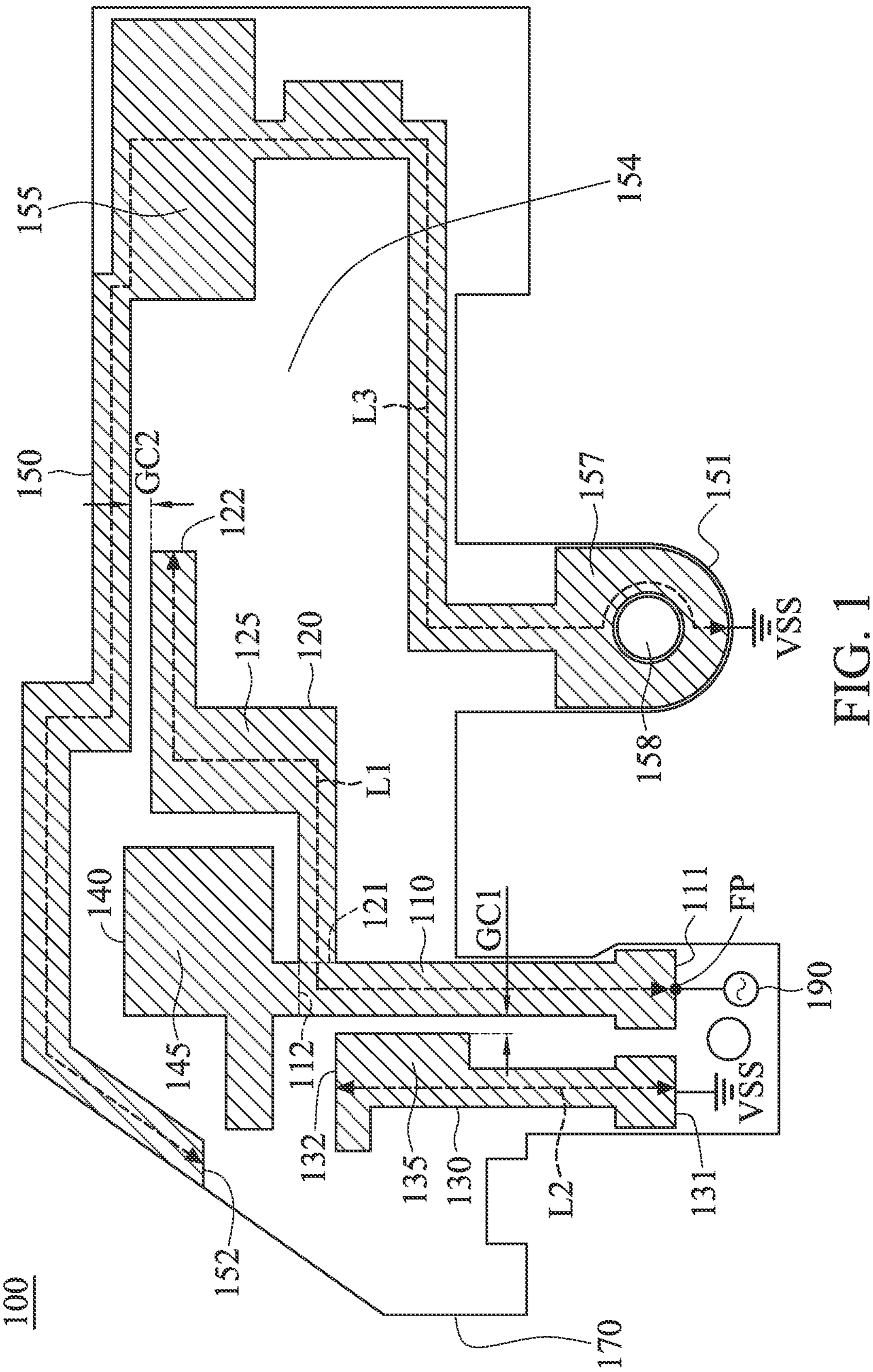
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. For example, the antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 at least includes a first radiation element 110, a second radiation element 120, a third radiation element 130, a fourth radiation element 140, a fifth radiation element 150, and a nonconductive support element 170. The first radiation element 110, the second radiation element 120, the third radiation element 130, the fourth radiation element 140, and the fifth radiation element 150 may all be made of metal materials, such as copper, silver, aluminum, iron, or their alloys.

The first radiation element 110 may substantially have a straight-line shape. Specifically, the first radiation element 110 has a first end 111 and a second end 112. A feeding point FP is positioned at the first end 111 of the first radiation element 110. The feeding point FP may be further coupled to a signal source 190. For example, the signal source 190 may be an RF (Radio Frequency) module for exciting the antenna structure 100.

The combination of the first radiation element 110 and the second radiation element 120 may substantially have a W-shape. Specifically, the second radiation element 120 has a first end 121 and a second end 122. The first end 121 of the second radiation element 120 is coupled to the second end 112 of the first radiation element 110. The second end 122 of the second radiation element 120 is an open end. In some embodiments, the second radiation element 120 includes a first widening portion 125, which may substantially have a rectangular shape.

The third radiation element 130 may substantially have a variable-width straight-line shape. Specifically, the third radiation element 130 has a first end 131 and a second end 132. The first end 131 of the third radiation element 130 is coupled to a ground voltage VSS. The second end 132 of the third radiation element 130 is an open end. For example, the ground voltage VSS may be provided by a system ground plane (not shown) of the antenna structure 100. The third radiation element 130 is adjacent to the first radiation element 110. A first coupling gap GC1 may be formed between the third radiation element 130 and the first radiation element 110. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0). In some embodiments, the third radiation element 130 includes a second widening portion 135, which may substantially have a relatively small rectangular shape.

The fourth radiation element 140 may substantially have an irregular shape. The fourth radiation element 140 is coupled to the second end 112 of the first radiation element 110. In some embodiments, the fourth radiation element 140 includes a third widening portion 145, which may substantially have a square shape.

The fifth radiation element 150 may substantially have a meandering shape. The first radiation element 110, the second radiation element 120, the third radiation element 130, and the fourth radiation element 140 are at least partially surrounded by the fifth radiation element 150. The fifth radiation element 150 may further define a notch region 154, and the second end 122 of the second radiation element 120 may extend into the interior of the notch region 154. Specifically, the fifth radiation element 150 has a first end 151 and a second end 152. The first end 151 of the fifth radiation element 150 is coupled to the ground voltage VSS. The second end 152 of the fifth radiation element 150 is an open end. The fifth radiation element 150 is adjacent to the second radiation element 120. A second coupling gap GC2 may be formed between the fifth radiation element 150 and the second radiation element 120. In some embodiments, the fifth radiation element 150 includes a fourth widening portion 155, which may substantially have a relatively large rectangular shape. In some embodiments, the fifth radiation element 150 includes a terminal widening portion 157, which is positioned at the first end 151 of the fifth radiation element 150. The terminal widening portion 157 of the fifth radiation element 150 may have an opening 158. For example, the opening 158 may substantially have a circular shape or a square shape, and thus the fifth radiation element 150 may be affixed to the system ground plane using a screw (not shown).

The nonconductive support element 170 may be a plastic element or a dielectric substrate, such as an FR4 (Flame Retardant 4) substrate, a PCB (Printed Circuit Board), or an FPC (Flexible Printed Circuit). The first radiation element 110, the second radiation element 120, the third radiation element 130, the fourth radiation element 140, and the fifth radiation element 150 may all be disposed on the same surface of the nonconductive support element 170, such that the antenna structure 100 may be a planar antenna structure. However, the invention is not limited thereto. In alternative embodiments, the first radiation element 110, the second radiation element 120, the third radiation element 130, the fourth radiation element 140, and the fifth radiation element 150 are disposed on different surfaces of the nonconductive support element 170, so as to form a 3D (Three-Dimensional) antenna structure.

Figure 2:
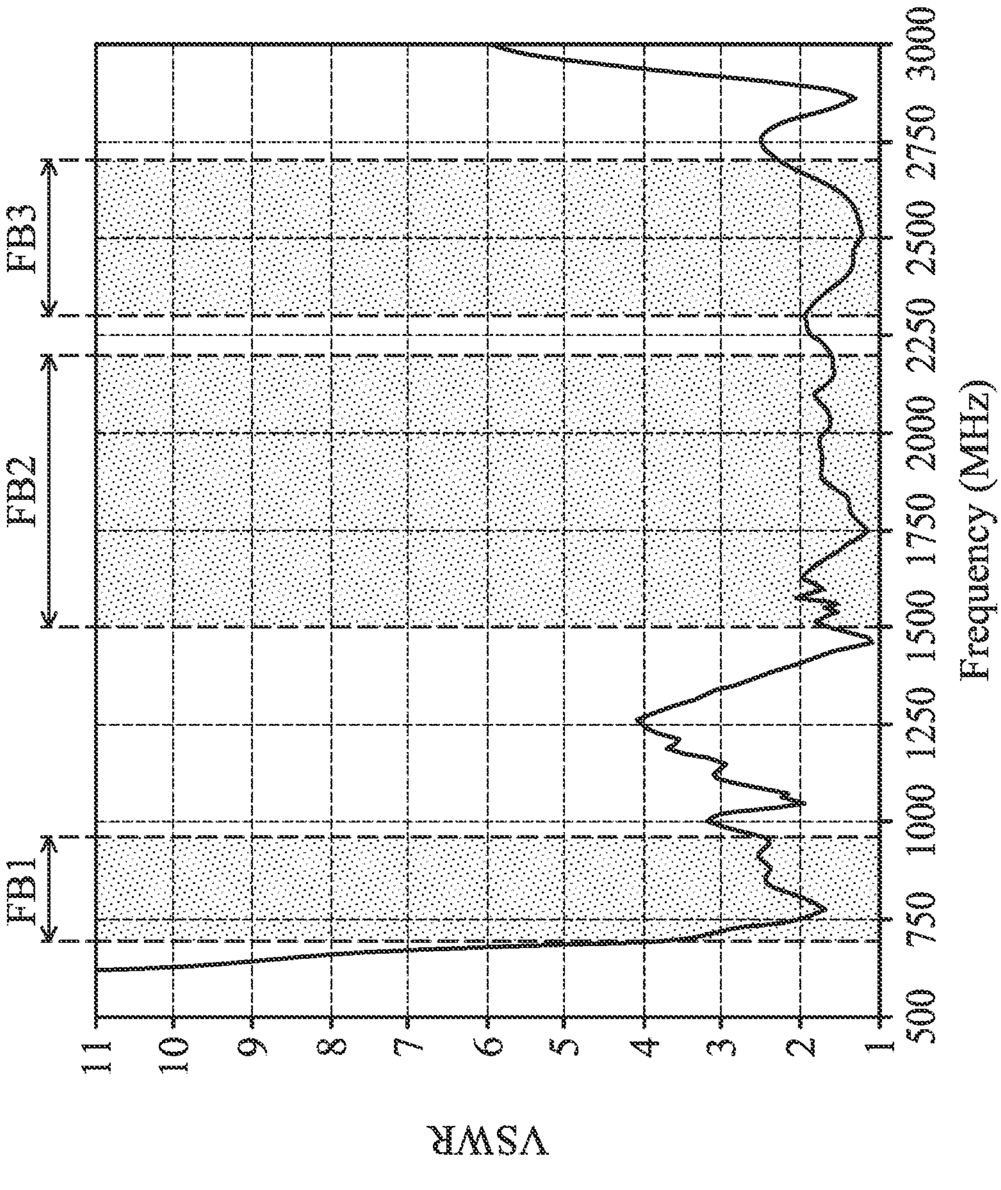
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 690 MHz to 960 MHz, the second frequency band FB2 may be from 1500 MHz to 2200 MHz, and the third frequency band FB3 may be from 2300 MHz to 2700 MHz. Therefore, the antenna structure 100 can support at least the wideband operations of LTE (Long Term Evolution) and GPS (Global Positioning System).

In some embodiments, the operational principles of the antenna structure 100 will be described as follows. The first radiation element 110 and the second radiation element 120 are excited together to generate the second frequency band FB2. The third radiation element 130 is excited by the first radiation element 110 using a coupling mechanism, so as to form the third frequency band FB3. The fifth radiation element 150 is excited by the first radiation element 110 and the second radiation element 120 using another coupling mechanism, so as to form the first frequency band FB1. According to practical measurements, the fifth radiation element 150 is configured to prevent environmental factors (e.g., a nearby metal component) from negatively affecting the radiation performance of the antenna structure 1M. In addition, the first widening portion 125 of the second radiation element 120, the second widening portion 135 of the third radiation element 130, the third widening portion 145 of the fourth radiation element 140, and the fourth widening portion 155 of the fifth radiation element 150 are configured to fine-tune the impedance matching of the first frequency band FB1, the second frequency band FB2, and the third frequency band FB3 as mentioned above.

In some embodiments, the element sizes of the antenna structure 100 will be described as follows. The total length L1 of the first radiation element 110 and the second radiation element 120 may be substantially equal to 0.25 wavelength (V4) of the second frequency band FB2 of the antenna structure 100. The length L2 of the third radiation element 130 may be substantially equal to 0.25 wavelength (λ4) of the third frequency band FB3 of the antenna structure 100. The length L3 of the fifth radiation element 150 may be substantially equal to 0.25 wavelength (λ/4) of the first frequency band FB1 of the antenna structure 100. The width of the first coupling gap GC1 may be from 0.25 mm to 3 mm. The width of the second coupling gap GC2 may be from 0.25 mm to 3 mm. The above ranges of element sizes and parameters are calculated and obtained according to many experiment results, and they help to optimize the operational bandwidth and impedance matching of the antenna structure 100.

Figure 3:
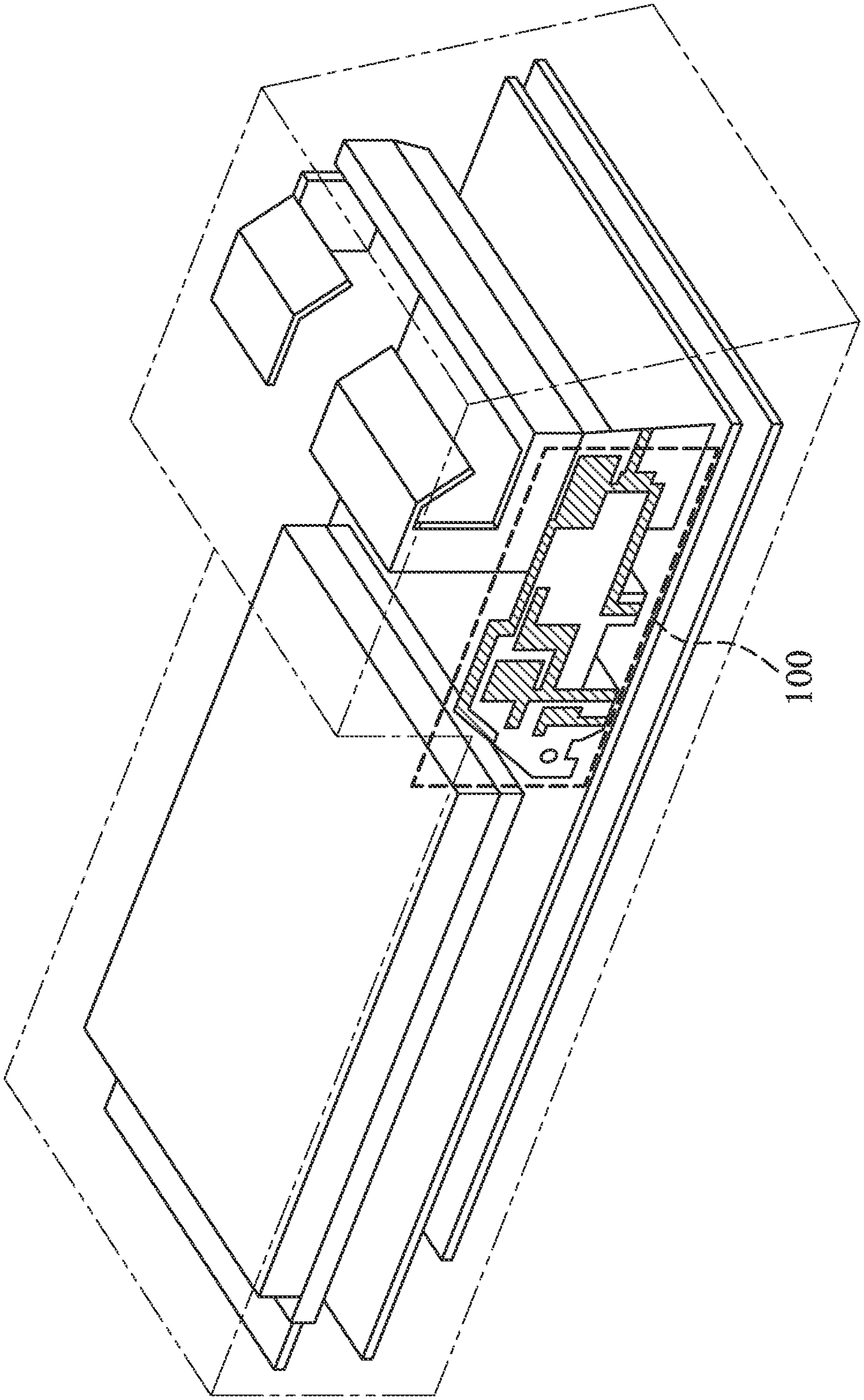
FIG. 3 is a diagram of a POS (Point of Sale) system according to an embodiment of the invention.

FIG. 3 is a diagram of a POS (Point of Sale) system 300 according to an embodiment of the invention. In the embodiment of FIG. 3, the POS system 300 includes the aforementioned antenna structure 100, and thus the POS system 300 supports the function of wireless communication. In some embodiments, the POS system 300 further includes an RF circuit, a filter, an amplifier, a processor, and/or a housing, but it is not limited thereto. It should be noted that the 3D structure of the antenna structure 100 is adjustable according to the style of the POS system 300, without affecting the communication quality thereof. Other features of the POS system 300 of FIG. 3 are similar to those of the antenna structure 100 of FIG. 1. Therefore, the two embodiments can achieve similar levels of performance.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a first radiation element, having a feeding point;

a second radiation element, coupled to the first radiation element;

a third radiation element, coupled to a ground voltage, and disposed adjacent to the first radiation element;

a fourth radiation element, coupled to the first radiation element;

a fifth radiation element, coupled to the ground voltage, and disposed adjacent to the second radiation element, wherein the first radiation element, the second radiation element, the third radiation element, and the fourth radiation element are at least partially surrounded by the fifth radiation element; and a nonconductive support element, wherein the first radiation element, the second radiation element, the third radiation element, the fourth radiation element, and the fifth radiation element are disposed on the nonconductive support element;

wherein the second radiation element comprises a first widening portion, and the third radiation element comprises a second widening portion.

2. The antenna structure as claimed in claim 1, wherein a combination of the first radiation element and the second radiation element substantially has a W-shape.

3. The antenna structure as claimed in claim 1, wherein the fourth radiation element comprises a third widening portion.

4. The antenna structure as claimed in claim 1, wherein the fifth radiation element substantially has a meandering shape for defining a notch region, and the second radiation element extends into an interior of the notch region.

5. The antenna structure as claimed in claim 1, wherein the fifth radiation element comprises a fourth widening portion and a terminal widening portion, and the terminal widening portion has an opening.

6. The antenna structure as claimed in claim 1, wherein a first coupling gap is formed between the third radiation element and the first radiation element, a second coupling gap is formed between the fifth radiation element and the second radiation element, and a width of each of the first coupling gap and the second coupling gap is from 0.25 mm to 3 mm.

7. The antenna structure as claimed in claim 1, wherein the antenna structure covers a first frequency band, a second frequency band, and a third frequency band, the first frequency band is from 690 MHz to 960 MHz, the second frequency band is from 1500 MHz to 2200 MHz, and the third frequency band is from 2300 MHz to 2700 MHZ.

8. The antenna structure as claimed in claim 7, wherein a total length of the first radiation element and the second radiation element is substantially equal to 0.25 wavelength of the second frequency band.

9. The antenna structure as claimed in claim 7, wherein a length of the third radiation element is substantially equal to 0.25 wavelength of the third frequency band.

10. The antenna structure as claimed in claim 7, wherein a length of the fifth radiation element is substantially equal to 0.25 wavelength of the first frequency band.

* * * * *